US005546304A

United States Patent [19]

Marschner et al.

[11] Patent Number: 5,546,304
[45] Date of Patent: Aug. 13, 1996

[54] REAL-TIME ADMINISTRATION-TRANSLATION ARRANGEMENT

[75] Inventors: Jamie J. Marschner, Northglenn; Stephanie L. Renquist, Brighton, both of Colo.

[73] Assignee: AT&T Corp., Murray Hill, N.J.

[21] Appl. No.: 495,197

[22] Filed: Jun. 23, 1995

Related U.S. Application Data

[63] Continuation of Ser. No. 205,916, Mar. 3, 1994, abandoned.

[51] Int. Cl.$^6$ .................... G06F 17/28; H04M 3/00; H04M 5/00
[52] U.S. Cl. ................. 364/419.04; 364/419.05; 364/419.07; 364/419.16; 379/268; 379/269
[58] Field of Search .................. 364/419.02, 419.04, 364/419.05, 419.07, 419.11, 419.16; 379/90, 94, 268, 289

[56] References Cited

U.S. PATENT DOCUMENTS

| | | | |
|---|---|---|---|
| 4,654,798 | 3/1987 | Taki et al. | 364/419.07 |
| 4,731,735 | 3/1988 | Borgendale et al. | 395/600 |
| 4,733,368 | 3/1988 | Morimoto et al. | 364/419.07 |
| 4,949,302 | 8/1990 | Arnold et al. | 395/375 |
| 4,972,453 | 11/1990 | Daniel, III et al. | 379/10 |
| 5,201,042 | 4/1993 | Weisner et al. | 395/500 |
| 5,222,160 | 6/1993 | Sakai et al. | 382/57 |
| 5,333,183 | 7/1994 | Herbert | 379/112 |

OTHER PUBLICATIONS

*Configuration and Systems Handbook*, AT&T Global Information Solutions (2Q94), pp. 67–78.
*AT&T Definity*$^R$ Communications Systems Generic 3 Management Applications, AT&T (1994).
*Definity*$^R$ Communications System Generic 3r, Maintenance Vol. 1, Chapters 1–9E, AT&T document No. 555–230–105, Issue 3, (Jul. 1993), pp. 3–1 to 3–9.
*Definity*$^R$ Communications System Generic 3r Implementation, AT&T document No. 555–230–651, Issue 2 (Jul. 1992), Chapters 2–5.

*Primary Examiner*—Robert A. Weinhardt
*Assistant Examiner*—Stephen R. Tkacs
*Attorney, Agent, or Firm*—David Volejnicek

[57] ABSTRACT

A translation database (23) is used to allow an administrator to use a foreign language to administer, in real time, a switching system (10) whose administration database (11) is constructed from forms, files, and other administration patterns expressed in a native language and that stores administration data also expressed in the native language. The translation database is constructed from equivalents of the administration patterns that are expressed in the foreign language. The translation database is devoid of the administration data, but includes information that is enterable by the administrator as administration data, expressed in both the native language and the foreign language. All communications exchanged between the administration database and the administrator are translated by the administration terminal (20) through the translation database, such that all interaction with the administrator is effected in the foreign language yet all interaction with the administration database is effected in the native language.

9 Claims, 5 Drawing Sheets

REAL-TIME ADMINISTRATION-TRANSLATION ARRANGEMENT

This application is a continuation of application Ser. No. 08/205,916, filed on Mar. 3, 1994, now abandoned.

TECHNICAL FIELD

This invention relates to telecommunications systems in general, and particularly relates to the administration of telecommunications systems.

BACKGROUND OF THE INVENTION

The administration of a telecommunication system involves providing the system with information concerning the system's physical and functional configuration. Commonly, administration is effected by the system administrator calling up a variety of forms (500 in one known system) on the display of the system's administration terminal and filling out the forms with the appropriate data. The forms and the filled-in data are stored in the system's database, where they remain available for use both by the system in providing telecommunications services and by the administrator in changing the system's administration data.

The forms include labels, prompts, descriptors, switch fields, titles, keywords, commands, messages, etc. in a particular language, e.g., English, and are filled in by the administrator with data expressed in that same language. The administrator therefore must be a person who knows that language—not only conversationally, but who also knows the technical jargon of telecommunications in that language. This presents a serious problem to the deployment of the telecommunications system internationally, because administrators having that language capability may be difficult, if not impossible, to find in many countries. In any event, a capability to administer the system in a country's own language will almost invariably be preferred by system purchasers, for a variety of reasons, thus placing the vendors whose systems can only be administered in another language at a serious competitive disadvantage.

These considerations have led international vendors to offer a plurality of "loads" for their telecommunications systems, each designed using a different language. A "load" is the set of telecommunications software, including the administration software, under whose control the system operates and interacts with the world. However, each different-language load has significant costs to the vendor associated with it; costs of developing the load, testing it, maintaining and upgrading it, making and distributing it, stocking it, keeping track of it, etc. These costs normally make it uneconomical to offer "loads" in more than a limited number of widely-used languages. As a consequence, the vendor is forced to forego business opportunities in countries where other languages are commonly used.

SUMMARY OF THE INVENTION

This invention is directed to solving these and other problems and disadvantages of the prior art. According to the invention, an arrangement is provided that allows an administrator to use a foreign language to administer a telecommunications system whose administration is designed to be effected in a different, native language and whose administration data must be expressed in the native language. This allows the telecommunications system to operate with a single, native-language, "load" irrespective of the language that is or will be used to administer the system, and substantially eliminates the language barriers and related language-related difficulties to system administration.

According to one aspect of the invention, an administrable telecommunications entity, such as a telecommunications switching system, that has an administration database which administers the entity by storing administration data expressed in a native language and which is constructed from administration patterns—for example, administration forms and files—expressed in the native language, is administered according to the following method: obtaining an administration pattern expressed in the native language from the administration database; in response to the obtaining, effecting translation of the obtained pattern through a translation database constructed from equivalents of the administration patterns expressed in a foreign language, the translation database being devoid of the administration data but including information that is receivable from an administrator as administration data and expressed in both the native and the foreign languages; in response to the effected pattern translation, presenting the translated pattern to an administrator; receiving from the administrator administration data indicated by the presented pattern and expressed in the foreign language; in response to the receipt, effecting translation of the received data through the translation database into translated data expressed in the native language; and in response to the effected data translation storing the translated data in the administration database as the administration data.

According to another aspect of the invention, an apparatus comprises the above-characterized administrable telecommunications entity and administration database, a translation database constructed from equivalents of the administration patterns expressed in a foreign language, the translation database being devoid of the administration data but including information that is enterable by an administrator as administrative data and expressed in both the native and the foreign language, and an arrangement, such as an administrative terminal, that carries out the above-characterized method.

According to a further aspect of the invention, there is provided the above-characterized translation database, for use with the stated arrangement in administering the above-characterized entity in a foreign language.

The invention permits a telecommunications system to be administered in any foreign language for which a translation database has been developed. Advantageously, only the translation database must change when the (foreign) language of administration changes, thereby allowing the telecommunications system, including its "load", to remain the same. Also, the invention provides for real-time translation of administration activities between the native and foreign languages, permitting both administration and re-administration to be performed at any time.

These and other advantages and features of the invention will become more apparent from the following description of an illustrative embodiment of the invention taken with the drawing.

DETAILED DESCRIPTION

Figure 1:
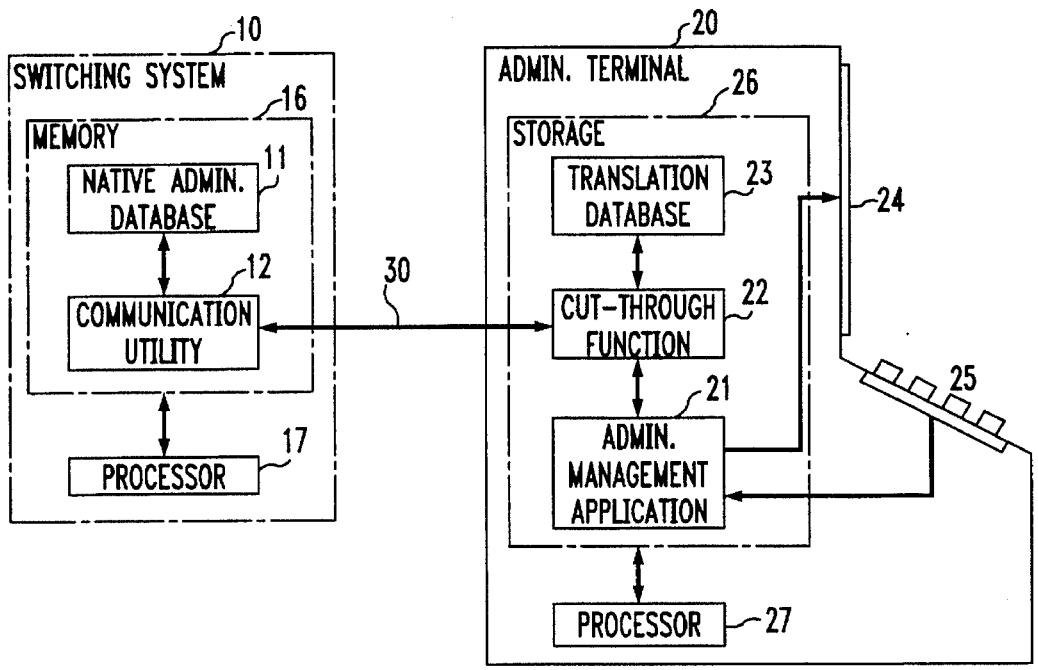
FIG. 1 is a block diagram of a telecommunications system embodying an illustrative example of the invention.

FIG. 1 shows a telecommunications switching system 10 and its administrative terminal 20. Switching system 10 is conventional, such as an AT&T Definity® G3 private branch exchange (PBX). It is a stored program-controlled entity, driven by a processor 17 which executes programs and obtains data out of memory 16. Memory 16 includes an administration database expressed in a native language (e.g., English), referred to as a native administration database 11. Administration database 11 includes not only the administration data for switching system 10, but also the entire user interface through which an administrator interacts with switching system 10 to administer system 10. Memory 16 also includes a communications utility 12 through which database 11 communicates with an administration terminal 20 over a link 30. Communications utility 12 recognizes a "PC terminal" type as a special kind of administration terminal; the implications thereof are discussed further below.

Administration terminal 20 is illustratively a personal computer (PC)-based unit, such as the NCR 3315 or 3333 PC. It comprises a storage 26 that comprises both main memory and a disk, a processor 27 that executes programs out of storage 26, and a display 24 and a keyboard 25 through which an administrator interacts with terminal 20. Storage 26 contains an administration management application 21, such as the AT&T G3-MA program, that converts the general-purpose PC into an administration terminal. For purposes of this discussion, administration management application 21 acts as a communications function that interfaces display 24 and keyboard 25 of administration terminal 20 with the higher-levels of a communications protocol of link 30. According to the invention, storage 26 also includes a translation database 23 that enables administration of switching system 10 to be effected by an administrator in a foreign language, and a cut-through function 22 that conventionally acts as a selectively-programmable software switch to connect switching system 10 to administration management application 21 in one of two modes: directly, or indirectly through translation database 23.

In the direct mode, switching system 10 is administered through administration terminal 20 in the switching system's native language (e.g., English), in a conventional manner, and translation database 23 is not used. In the indirect mode, switching system 10 is administered through administration terminal 20 in a foreign language (e.g., Italian). Which foreign language can be used is a function of the particular translation database 23 that is present—translation databases 23 may be available for any number of foreign languages.

In the indirect mode, all foreign-language output of terminal 20 being sent by administration management application 21 to switching system 10 is intercepted and routed by cut-through function 22 through translation database 23, to effect translation thereof into the native language. Cut-through function 22 then substitutes the translated, native-language information for the foreign-language information for input to switching system 10. Similarly, all native-language output of switching system 10 destined for administration terminal 20 is intercepted and routed by cut-through function 22 through translation database 23, to effect translation thereof into the foreign language. Cut-through function 22 then provides the translated, foreign-language, information instead of the native-language information as input to administration management application 21.

Figure 2:
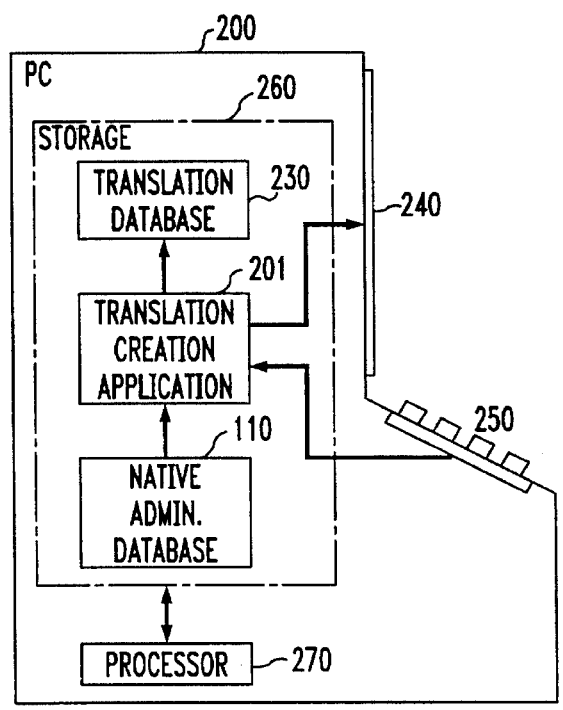
FIG. 2 is a block diagram of an arrangement for developing the translations database of the system of FIG. 1.

Translation database 23 for a particular foreign language is initially created on a computer such as a PC 200, as shown in FIG. 2. Illustratively, PC 200 may be the same as administrative terminal 20. It comprises a processor 270, a storage 260 that holds programs and data for use by processor 270, and a display 240 and a keyboard 250 through which a translator interacts with terminal 200. Storage 260 holds a copy 110 of a non-administered native administration database 11 of switching system 10. Copy 110 is non-administered in the sense that it is not filled in (populated) with administration data. But it does contain the forms and other data structures—generically referred to herein as administration patterns—that the administrator fills in with data to administer switching system 10, and the information files—e.g., files of keywords or pattern names—from which the administrator makes menu selections or selections of administrative data with which he or she populates the administration patterns, as well as the above-mentioned interface through which the administrator interacts with switching system 10. Storage 260 further holds a translation-creation application 201 which provides the functions necessary to enable the translator to create a translation of database 110, and a translation database 230 in which the translation of database 110 is created and stored. Initially, translation database 230 is blank; that is, it is formatted as database 110, but it is otherwise empty and is not populated with any information. It is the function of the translator acting in cooperation with translation-creation application 201 to provide the foreign-language equivalent of the information files, the administration patterns, and the user interface from which database 110 is constructed, to create in translation database 230 a foreign-language version of copy 110, which will serve as a master copy of translation database 23.

Figure 3:
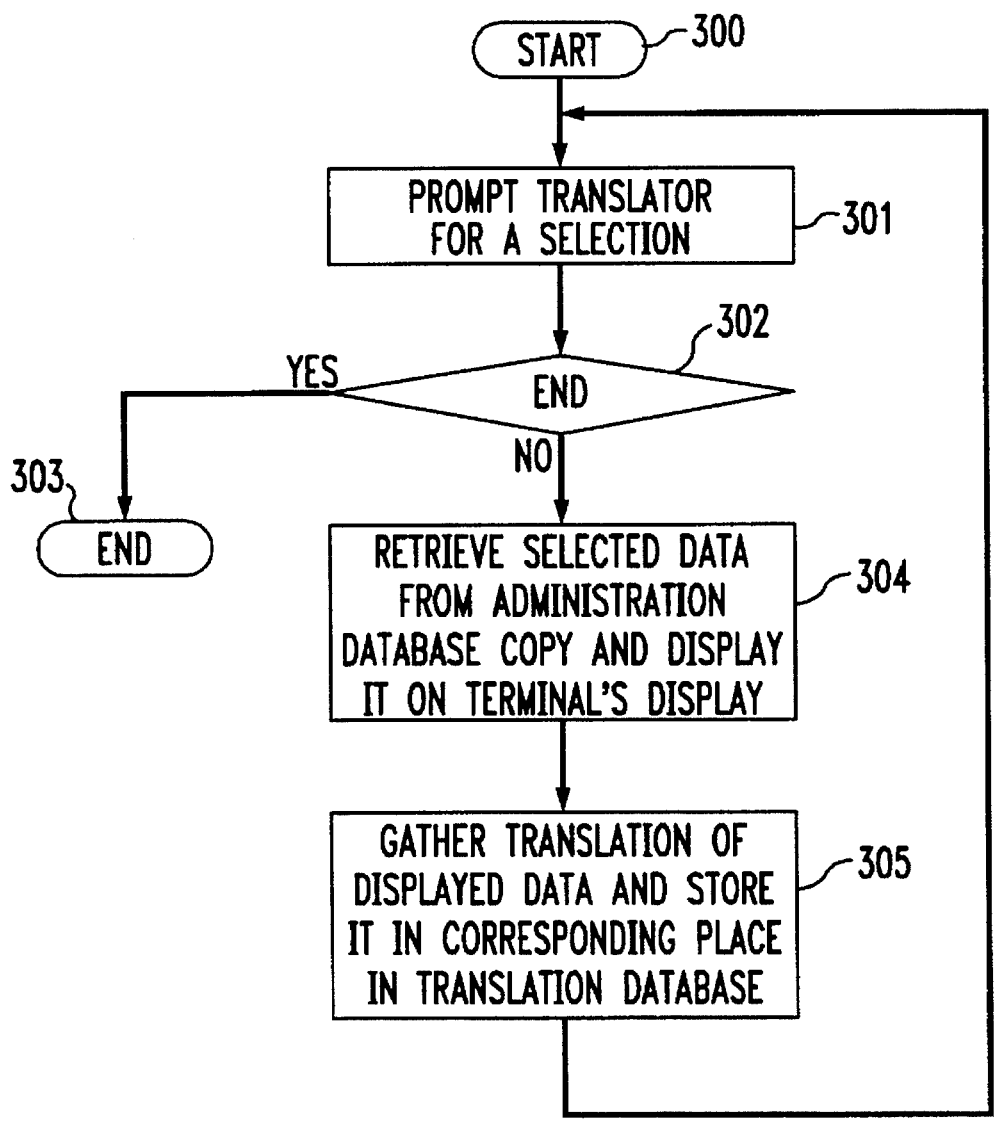
FIG. 3 is a functional flow diagram of the translation generation application of the arrangement of FIG. 2.

The functionality of translation-creation application 201 that is relevant to this discussion is diagrammed in FIG. 3. Upon being invoked, at step 300, it prompts the translator via messages displayed on display 240 to select a set of data that he or she wishes to translate or to end the session, at step 301. The translator indicates his or her selection by means of keyboard 250. If and when the translator selects to end the session, as determined at step 302, execution of application 201 ends, at step 303. If the translator selects a set of data—a pattern, an information file, or a portion of the user interface—application 201 retrieves the selected set of data from database 110 and displays the retrieved data on display 240, at step 304. Illustratively, application 201 uses the dbVISTA commercial database program of Raima Corp. as an interface to database 110 to effect the retrieval. The translator then uses the display cursor to select individual items of the data that is displayed on display 240 and enters the selected items' translations via keyboard 250. Application 201 gathers the entered foreign-language translations and stores them in translation database 230 in the identical places within the database structure where their native-language equivalents are stored in database 110, at step 305. Illustratively, application 201 again uses the dbVISTA program as an interface to database 230 to effect the storage. In the case of the administration patterns and the user interface, only the foreign-language translations thereof are stored in translation database 230. In the case of the information files, both the native-language versions and the foreign-language translations are stored in translation database 230. When the translator indicates that he or she is done using the displayed data, application 201 returns to step 301 to prompt the translator for another selection. When the translator has completed translating all data held by database 110, translation database 230 is fully populated and contains a master copy of translation database 23. This copy may now be conventionally replicated and the replicas may be installed on administration terminals 20 as translation database 23 to create the system of FIG. 1.

Figure 4:
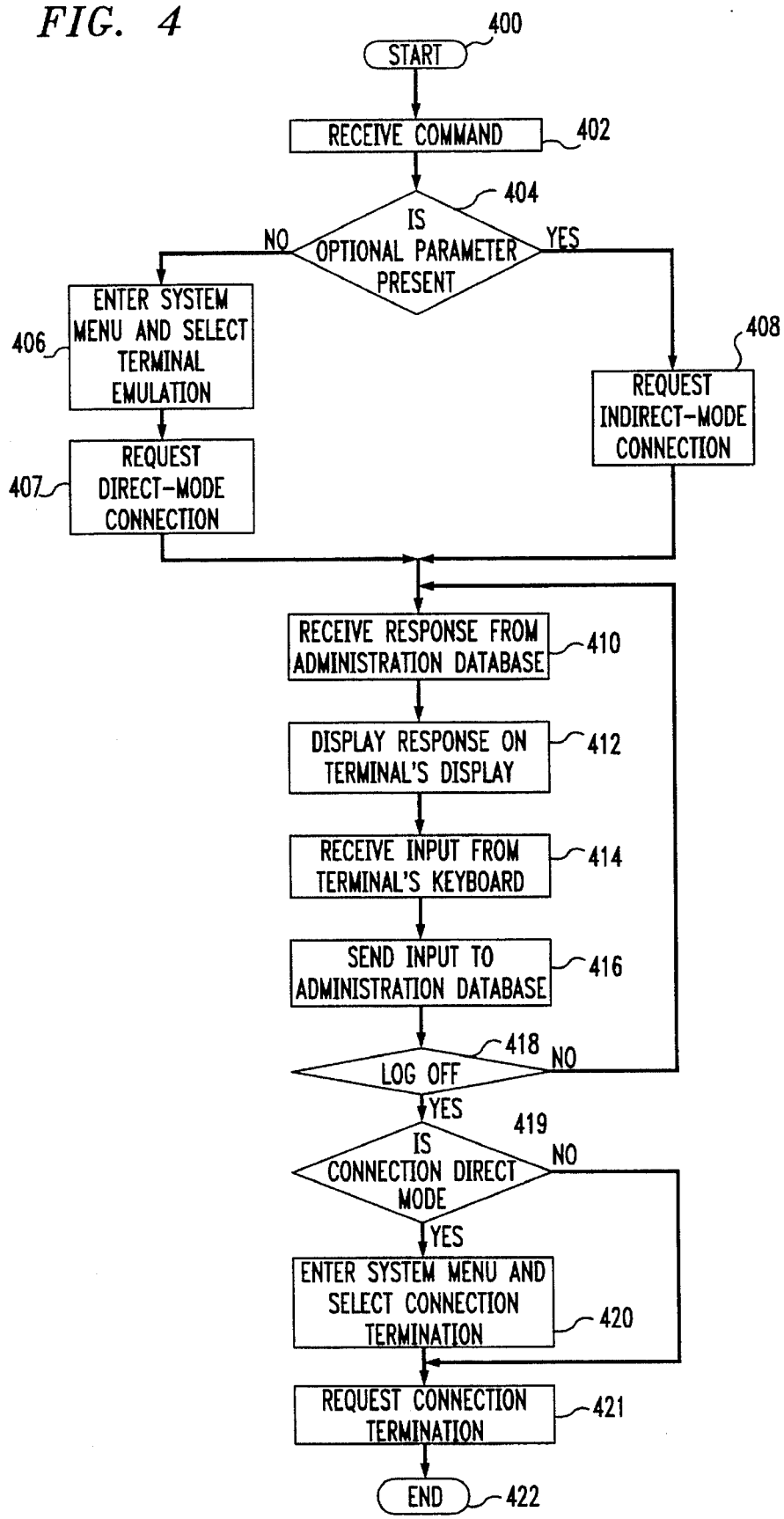
FIG. 4 is a functional flow diagram of the administration management application of the system of FIG. 1.

The use of translation database 23 as a part of the system of FIG. 1 will now be described in more detail. FIG. 4 shows the functionality of administration management application 21 that is relevant to this discussion. Upon being invoked by the administrator, at step 400, application 21 expects to receive an indication of whether the administrator wishes to administer switching system 10 in the native language of system 10 or in a foreign language. The former is indicated by a command not accompanied by an optional parameter; the latter is indicated by the command accompanied by an optional parameter. No other input from the administrator is permitted at this point. When application 21 receives the administrator's input, at step 402, it checks for presence in the input of an optional parameter field, at step 404. If there is no optional parameter field present, application 21 enters the G3-MA system menu from which the administrator selects the terminal emulation application, at step 406. In response, application 21 requests cut-through function 22 to establish direct-mode communication with system 10, at step 407. If an optional-parameter field is present, application 21 requests cut-through function 22 to establish indirect-mode communication with system 10, at step 408. Application 21 now functions conventionally: whatever response it receives from database 11 through function 22, at step 410, it displays on display 24 of terminal 20, at step 412. Likewise, whatever input it receives from the administrator through keyboard 25 of terminal 20, at step 414, it sends to database 11 through function 22, at step 416. If it receives notification from function 22 that the administrator's input was a log-off command, as determined at step 418, application 21 checks whether the established connection to system 10 is direct-mode or indirect-mode, at step 419. If the connection is direct-mode, application 21 again enters the G3-MA system menu from which the administrator selects connection termination, at step 420. In response, application 21 requests function 22 to terminate the communications connection to system 10, at step 421, and ends execution, at step 422. If the connection is determined at step 419 to be indirect-mode, application 21 proceeds directly to steps 421 et seq.

Figure 5:
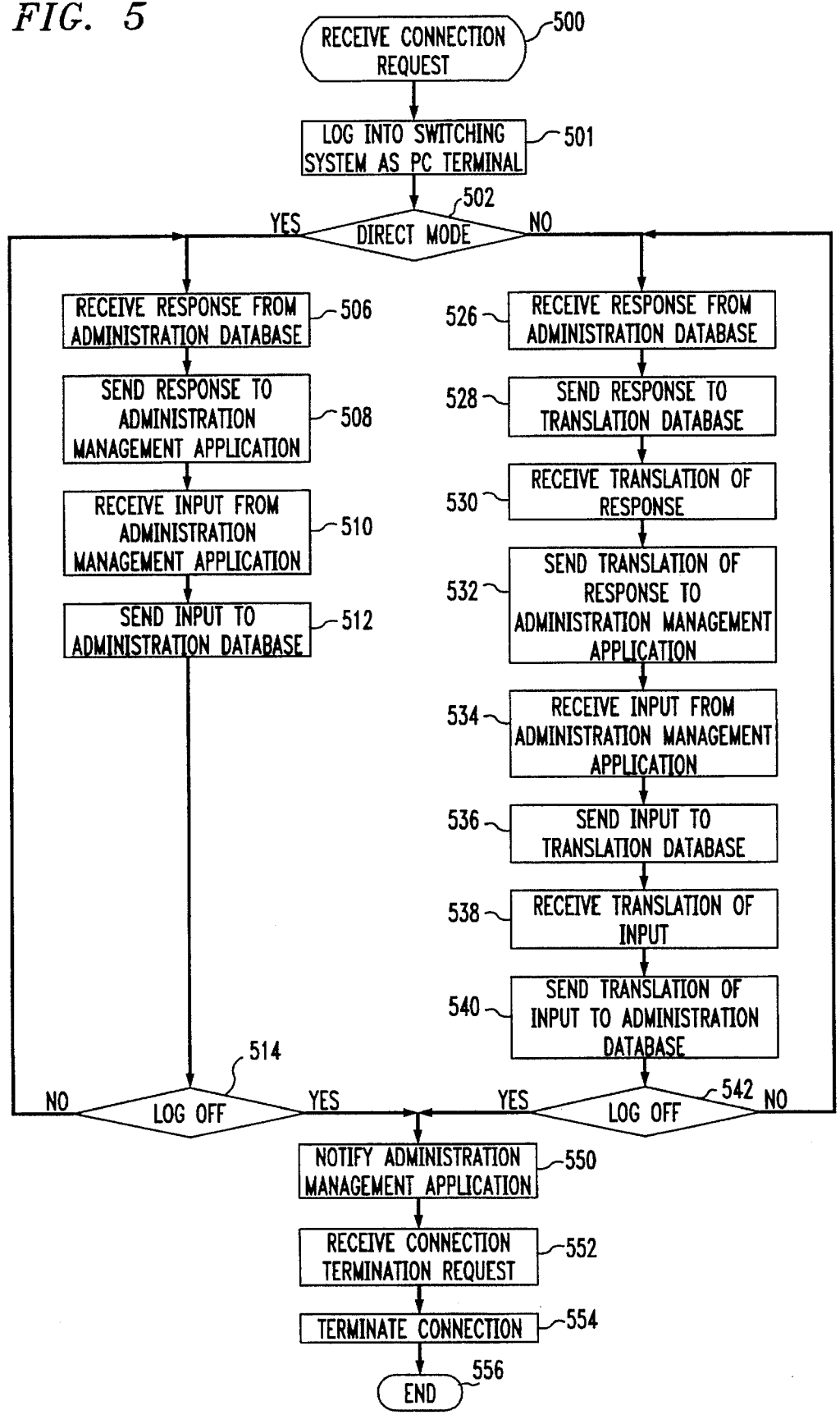
FIG. 5 is a functional flow diagram of the cut-through function of the system of FIG. 1.

Turning to FIG. 5, which shows the functionality of cut-through function 22 that is relevant hereto, it receives the request to establish a communication connection with system 10, at step 500, and in response it logs into switching system 10 as a "PC terminal", at step 501. Function 21 then checks whether direct mode or indirect mode is requested, at step 502. If the request is for a direct-mode connection, communications with system 10 will bypass translation database 23, but if the request is for an indirect-mode connection, communications with system 10 will proceed through database 23.

The login from administrative terminal 20 is received by communications utility 12, and utility 12 proceeds conventionally to facilitate communications between native administration database 11 and terminal 20. As part thereof, utility 12 requests database 11 to supply location indexes with any of its contents that it provides. The location indexes identify the precise location of the provided contents within the structure of database 11. Database 11 also functions conventionally, providing the location indexes for any database contents that it sends out.

Returning to FIG. 5, the functionality of cut-through function 22 is determined by whether it has established a direct-mode or an indirect-mode connection to switching system 10. If the connection is a direct-mode connection, function 22 takes whatever information it receives from native administration database 11, at step 506, and merely forwards it on to administration management application 21, at step 508. Similarly, it takes whatever information it receives from application 21, at step 510, and sends it on to native administration database 11, at step 512. It also checks the input from application 21 to determine if it is a log-off command, at step 514. If not, it merely returns to repeat steps 506–514; if so, it notifies application 21, at step 550. As was explained in conjunction with FIG. 4, application 21 responds to the notification by requesting function 22 to terminate the connection to switching system 10. When function 22 receives this request, at step 552, it terminates the connection as requested, at step 554, and then ends its execution, at step 556.

If the connection to switching system 10 is an indirect-mode connection, function 22 takes whatever information it receives from native administration database 11, at step 526, and sends it to translation database 23, at step 528. Translation database 23 provides a foreign-language translation of the information, at step 530, and function 22 forwards the translation on to application 21, at step 532. Similarly, function 22 takes whatever information it receives from application 21, at step 534, and sends it to translation database 23, at step 536. Translation database 23 provides a native-language translation of the information, at step 538, and function 22 sends the translation to native administration database 11, at step 540. Function 22 also checks this translation to determine if it contains a log-off command, at step 542. If not, it merely returns to repeat steps 526–542; if so, it proceeds to steps 550 et seq., which were described above.

Figure 6:
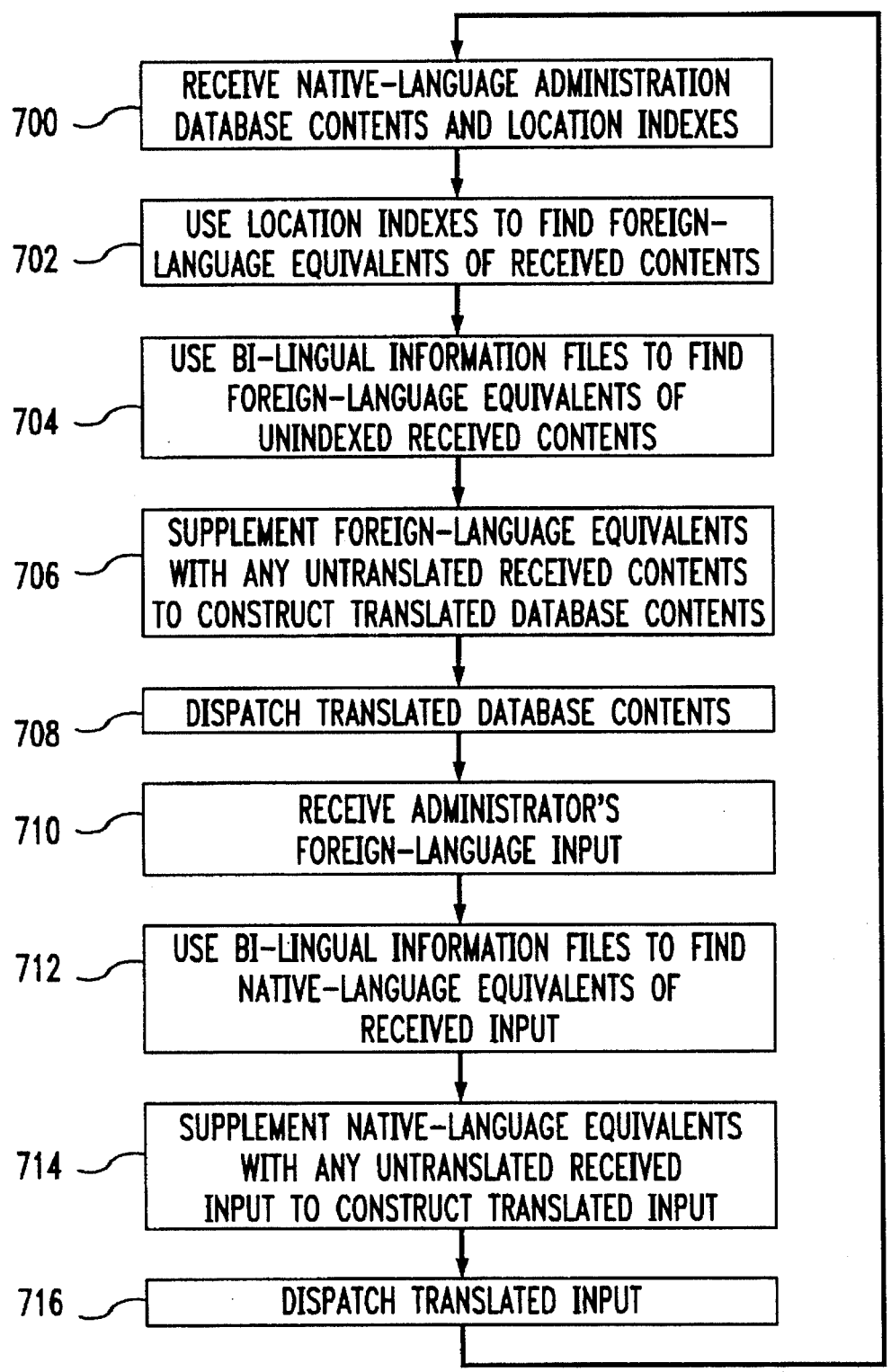
FIG. 6 is a functional flow diagram of operation of the translation database of the system of FIG. 1.

The operation of translation database 23 is shown in FIG. 6. Upon receiving from function 22 the native-language contents of native administration database 11 accompanied by their location indexes, at step 700, translation database 23 uses the location indexes to find in translation database 23 the foreign-language equivalents of the received native-language database contents, at step 702. Translation database 23 also uses its bilingual information files to find foreign-language equivalents of any unindexed information that was received at step 700, at step 704. Unindexed information comprises any filled-in administration data that is contained within an administration pattern received at step 700. Translation database 23 then supplements the foreign-language information obtained at steps 702 and 704 with any information that it received at step 700 that remains untranslated, at step 706. Untranslated information comprises either any information for which the corresponding index points to a blank entry in database 23, or for which the bi-lingual files do not contain a corresponding foreign-language equivalent. The untranslated information is, for example, information that is not to be translated for some reason. Information not needing translation comprises numerical information in the case where the foreign language uses the same system of numerical representation as the native language. The basic translation obtained at steps 702 and 704 supplemented at step 706 with any untranslated information forms the translation of the received database contents, and translation database 23 provides this translation to function 22, at step 708.

Upon receiving from function 22 the administrator's foreign-language input to administration database 11, at step 710, translation database 23 uses its bi-lingual information files to obtain the native-language translation of this input, at step 712. Translation database 23 then supplements the native-language translation with any information that it received at step 700 that remains untranslated, at step 714. The untranslated information is of the same type as was discussed in conjunction with step 706. Having thus formed a translated input, translation database 23 provides the translated input to function 22, at step 716.

In the manner described above, administration of system 10 is carried out by an administrator using a foreign language, and database 23 provides real-time translations between the foreign language and the native language of system 10 to effect the actual administration of system 10 in the native language of system 10.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

What is claimed is:

1. An apparatus comprising:

an administrable telecommunications entity;

an administration database for storing administration data expressed in a native language, coupled to the entity and constructed from administration patterns expressed in the native language that are selectively filled in with said administration data, the administration patterns having corresponding indexes for identifying the administration patterns, the administration data expressed in the native language serving to administer the entity;

a translation database constructed from equivalents of the administration patterns expressed in a foreign language that are not filled in with the administration data, the translation database being devoid of the administration data but including information that is enterable by an administrator as administration data and expressed in both the native and the foreign languages;

means connected to the administration database, for obtaining an administration pattern including any filled-in administration data expressed in the native language and the index of said administration pattern from the administration database;

means connected to the obtaining means and to the translation database, responsive to the obtaining for effecting translation of the obtained pattern including any filled-in administration data through the translation database into a translated pattern expressed in the foreign language by using the index of the obtained administration pattern to find in the translation database the equivalent of the obtained administration pattern, finding among the administrator-enterable information in the translation database information in the foreign language that corresponds to any translatable said administration data in the obtained administration pattern, and filling in the found equivalent of the obtained administration pattern with the found information and any non-translatable said administration data from the obtained administration pattern;

means connected to the means for effecting translation of the obtained pattern, responsive to the effected pattern translation for presenting the translated pattern including the filled-in information and data to the administrator;

entry means for the administrator to enter administration data indicated by the presented pattern, and expressed in the foreign language;

means connected to the entry means and to the translation database, responsive to the entering for effecting translation of the entered data through the translation database into translated data expressed in the native language by finding among the information in the translation database information in the native language that corresponds to any translatable said entered data; and means connected to the means for effecting translation of the entered data and to the administration database, responsive to the effected data translation for storing the translated data and any non-translatable said data as administration data in the administration database.

2. The apparatus of claim 1 wherein:

the entry means include means for the administrator to enter a request for an administration pattern, the request expressed in the foreign language; and the obtaining means include means responsive to the entered request for effecting translation of the entered request through the translation database into a translated request expressed in the native language, means connected to the means for effecting translation of the entered request and to the administration database, for communicating the translated request to the administration database, and means connected to the administration database, for receiving from the administration database the requested administration pattern expressed in the native language.

3. The apparatus of claim 1 further comprising:

an administration terminal that includes the translation database, the obtaining means, the means for effecting pattern translation, the presenting means, the entry means, the means for effecting data translation, and the storing means.

4. An administration terminal for administering in a foreign language an administrable telecommunications entity having an administration database for storing administration data expressed in a native language, the administration database constructed from administration patterns expressed in the native language that are selectively filled in with said administration data, the administration patterns having corresponding indexes for identifying the administration patterns, the administration data expressed in the native language serving to administer the entity, the administration terminal comprising:

a translation database constructed from equivalents of the administration patterns expressed in a foreign language that are not filled in with the administration data, the translation database being devoid of the administration data but including information that is enterable by an administrator as administration data and expressed in both the native and the foreign languages;

means for obtaining an administration pattern including any filled-in administration data expressed in the native language and the index of said administration pattern from the administration database;

means connected to the obtaining means and to the translation database, responsive to the obtaining for effecting translation of the obtained pattern including any filled-in administration data through the translation database into a translated pattern expressed in the foreign language by using the index of the obtained administration pattern to find in the translation database the equivalent of the obtained administration pattern, finding among the administrator-enterable information in the translation database information in the foreign language that corresponds to any translatable said administration data in the obtained administration pattern, and filling in the found equivalent of the obtained administration pattern with the found information and any non-translatable said administration data from the obtained administration pattern;

means connected to the means for effecting translation of the obtained pattern, responsive to the effected pattern translation for presenting the translated pattern including the filled-in information and data to the administrator;

entry means for the administrator to enter administration data indicated by the presented pattern, and expressed in the foreign language;

means connected to the entry means and to the translation database, responsive to the entering for effecting translation of the entered data through the translation database into translated data expressed in the native language by finding among the information in the translation database information in the native language that corresponds to any translatable said entered data; and means connected to the means for effecting translation of the entered data, responsive to the effected data translation for storing the translated data and any non-translatable said data as administration data in the administration database.

5. The administration terminal of claim 4 wherein:

the entry means include means for the administrator to enter a request for an administration pattern, the request expressed in the foreign language; and the obtaining means include means responsive to the entered request for effecting translation of the entered request through the translation database into a translated request expressed in the native language, means connected to the means for effecting translation of the entered request, for communicating the translated request to the administration database, and means connected to the means for effecting translation of the obtained pattern, for receiving from the administration database the requested administration pattern expressed in the native language.

6. A method of producing a translation database that serves to administer in a foreign language an administrable telecommunications entity having an administration database constructed from administration patterns expressed in a native language that are selectively filled in with administration data expressed in the native language, the administration patterns having corresponding indexes for identifying the administration patterns, the entity being administered by the administration database when the administration database stores the administration data expressed in the native language, and the entity further having an administration terminal that obtains an administration pattern including any filled-in administration data expressed in the native language and the index of said administration pattern from the administration database, effects translation of the obtained pattern including any filled-in administration data through the translation database into a translated pattern expressed in the foreign language by using the index of the obtained administration pattern to find in the translation database the equivalent of the obtained administration pattern, finding among the administrator-enterable information in the translation database information in the foreign language that corresponds to any translatable said administration data in the obtained administration pattern, and filling in the found equivalent of the obtained administration pattern with the found information and any non-translatable said administration data from the obtained administration pattern, presents the translation pattern including the filled-in information and data to an administrator, receives from the administrator administration data indicated by the presented pattern and expressed in the foreign language, effects translation of the received data through the translation database into translated data expressed in the native language by finding among the information in the translation database information in the native language that corresponds to any translatable said received data, and stores the translated data and any non-translatable said data as administration data in the administration database, comprising the steps of:

constructing the translation database from equivalents of the administration patterns expressed in a foreign language such that the equivalent of art administration pattern is able to be found in the translation database by using the index of said administration pattern, the equivalents not being populated with any administration data, so that the translation database is devoid of the administration data; and including with the translation database information that is enterable by an administrator as administration data and expressed in both the native and the foreign languages so that information in either language that corresponds to translatable administration data in either language is able to be found in the information included with the translation database for populating the administration database and the equivalents of the administration patterns.

7. A method for administering a telecommunications system comprising an administrable communications entity, an administration database for storing administration data expressed in a native language, the administration database being coupled to the entity and constructed from administration patterns expressed in the native language that are selectively filled in with said administration data, the administration patterns having corresponding indexes for identifying the administration patterns, the administration data expressed in the native language serving to administer the entity, the method comprising the steps of:

obtaining an administration pattern including any filled-in administration data expressed in the native language and the index of said administration pattern from the administration database;

in response to the obtaining, effecting translation of the obtained pattern including any filled-in administration data through a translation database constructed from equivalents of the administration patterns expressed in a foreign language that are not filled in with the administration data, the translation database being devoid of the administration data but including information that is receivable from an administrator as administration data and expressed in both the native and the foreign languages, by using the index of the obtained administration pattern to find in the translation database the equivalent of the obtained administration pattern, finding among the administrator-enterable information in the translation database information in the foreign language that corresponds to any translatable said administration data in the obtained administration pattern, and filling in the found equivalent of the obtained administration pattern with the found information and any non-translatable said administration data from the obtained administration pattern;

in response to the effected pattern translation, presenting the translated pattern including the filled-in information and data to an administrator;

receiving from the administrator administration data indicated by the presented pattern and expressed in the foreign language;

in response to the receipt, effecting translation of the received data through the translation database into translated data expressed in the native language by finding among the information in the translation database information in the native language that corresponds to any translatable said received data; and in response to the effected data translation, storing the translated data and any non-translatable said data as administration data in the administration database.

8. The method of claim 7 wherein:

the step of obtaining comprises the steps of receiving a request from the administrator for an administration pattern, the request expressed in the foreign language;

in response to the received request, effecting translation of the received request through the translation database into a translated request expressed in the native language;

in response to the effected request translation, communicating the translated request to the administration database; and receiving from the administration database the requested administration pattern expressed in the native language.

9. The method of claim 7 wherein:

the steps of obtaining, effecting pattern translation, presenting, receiving, and effecting data translation are performed on an administration terminal included in the telecommunications system.

\* \* \* \* \*

UNITED STATES PATENT AND TRADEMARK OFFICE
Certificate

Patent No. 5,546,304            Patented: August 13, 1996

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jamie J. Marschner, Stephanie L. Renquist, and Robert J. Moore.

Signed and Sealed this Sixteenth Day of February, 1999.

E. TODD VOELTZ
*Supervisory Patent Examiner*
Patent Examining Art Unit 2761